(12) United States Patent
Baratloo et al.

(10) Patent No.: US 8,326,806 B1
(45) Date of Patent: Dec. 4, 2012

(54) CONTENT ITEM PARAMETER FILTER

(75) Inventors: Arash Baratloo, Mountain View, CA (US); Eric Christopher Rollins, Sunnyvale, CA (US); Benjamin J. Young, El Cerrito, CA (US); Daniel Virabott Phang, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 510 days.

(21) Appl. No.: 11/747,367

(22) Filed: May 11, 2007

(51) Int. Cl.
   *G06F 7/00* (2006.01)
   *G06F 17/00* (2006.01)
   *G06F 17/30* (2006.01)

(52) U.S. Cl. .................. 707/688; 707/707; 707/735

(58) Field of Classification Search .................. None
   See application file for complete search history.

(56) References Cited

U.S. PATENT DOCUMENTS

| | | |
|---|---|---|
| 5,724,521 A | 3/1998 | Dedrick |
| 5,740,549 A | 4/1998 | Reilly et al. |
| 5,848,397 A | 12/1998 | Marsh et al. |
| 5,948,061 A | 9/1999 | Merriman |
| 6,026,368 A | 2/2000 | Brown et al. |
| 6,044,376 A | 3/2000 | Kurtzman, II |
| 6,078,914 A | 6/2000 | Redfern |
| 6,144,944 A | 11/2000 | Kurtzman, II et al. |
| 6,167,382 A | 12/2000 | Sparks et al. |
| 6,269,361 B1 | 7/2001 | Davis et al. |
| 6,401,075 B1 | 6/2002 | Mason et al. |
| 6,985,882 B1 | 1/2006 | Del Sesto |
| 7,039,599 B2 | 5/2006 | Merriman |
| 7,092,896 B2 * | 8/2006 | Delurgio et al. ............ 705/7.35 |
| 7,136,875 B2 | 11/2006 | Anderson et al. |
| 2003/0078838 A1 * | 4/2003 | Szmanda ........................ 705/14 |
| 2004/0162757 A1 * | 8/2004 | Pisaris-Henderson et al. . 705/14 |
| 2004/0181540 A1 * | 9/2004 | Jung et al. ..................... 707/100 |
| 2004/0193626 A1 * | 9/2004 | Colby et al. ................... 707/100 |
| 2004/0267762 A1 * | 12/2004 | Tunning et al. ............... 707/100 |
| 2005/0192987 A1 * | 9/2005 | Marsh ........................... 707/100 |
| 2005/0228797 A1 * | 10/2005 | Koningstein et al. ......... 707/100 |
| 2006/0041480 A1 * | 2/2006 | Briggs ............................ 705/14 |
| 2006/0117032 A1 * | 6/2006 | Dettinger et al. ............. 707/100 |
| 2006/0155603 A1 * | 7/2006 | Abendroth et al. ............ 705/14 |
| 2006/0206505 A1 * | 9/2006 | Hyder et al. ................... 707/100 |

(Continued)

FOREIGN PATENT DOCUMENTS

WO    WO 97/21183    6/1997

OTHER PUBLICATIONS

Benjam Edelman et al; Internet Advertising and the Generalized Second-Price Auction: Selling Billions of Dollars Worth of Keywords;2007; p. 242-258.*

(Continued)

*Primary Examiner* — Shew-Fen Lin
*Assistant Examiner* — Jermaine Mincey
(74) *Attorney, Agent, or Firm* — Fish & Richardson P.C.

(57) ABSTRACT

A set of one or more candidate parameters associated with a content item is identified. A subset of the one or more candidate parameters is determined. Performance statistics associated with the one or more candidate parameters in the subset are monitored, and the set of one or more candidate parameters or the subset of the one or more candidate parameters are modified based on the performance statistics.

21 Claims, 7 Drawing Sheets

U.S. PATENT DOCUMENTS

2006/0224581 A1* 10/2006 Sasai .................................. 707/5
2007/0055680 A1* 3/2007 Statchuk ........................ 707/100
2007/0067267 A1* 3/2007 Ives .................................. 707/3

OTHER PUBLICATIONS

U.S. Appl. No. 95/001,073, filed Sep. 30, 2004, Reexamination of Stone et al.

U.S. Appl. No. 95/001,061, filed Sep. 3, 2002, Reexamination of Stone et al.

U.S. Appl. No. 95/001,069, filed Jul. 11, 2002, Reexamination of Dean et al.

U.S. Appl. No. 95/001,068, filed Dec. 7, 2002, Reexamination of Stone et al.

AdForce, Inc., A Complete Guide to AdForce, Version 2.6, 1998.

AdForce, Inc., S-1/A SEC Filing, May 6, 1999.

AdKnowledge Campaign Manager: Reviewer's Guide, AdKnowledge, Aug. 1998.

AdKnowledge Market Match Planner: Reviewer's Guide, AdKnowledge, May 1998.

Ad-Star.com website archive from www. Archive.org, Apr. 12, 1997 and Feb. 1, 1997.

Baseview Products, Inc., AdManagerPro Administration Manual v. 2.0, Dec. 1998.

Baseview Products, Inc., ClassManagerPro Administration Manual v. 1.0.5, Feb. 1, 1997.

Business Wire, "Global Network, Inc. Enters Into Agreement in Principle With Major Advertising Agency," Oct. 4, 1999.

Information Access Technologies, Inc., Aaddzz brochure, "The Best Way to Buy and Sell Web Advertising Space," © 1997.

Information Access Technologies, Inc., Aaddzz.com website archive from www. Archive.org, archived on Jan. 30, 1998.

Zeff, R. et al., Advertising on the Internet, 2nd Ed., John Wiley & Sons, 1999.

Dedrick, R., Interactive Electronic Advertising, IEEE, 1994.

Dedrick, R., A Consumption Model for Targeted Electronic Advertising, Intel Architecture Labs, IEEE, 1995.

Request for Reexamination of U.S. Patent No. 7,240,025 B2, Control No. 95/001,073.

Request for Reexamination of U.S. Patent No. 6,446,045 B1, Control No. 95/001,061.

Request for Reexamination of U.S. Patent No. 7,249,059 B2, Control No. 95/001,069.

Request for Reexamination of U.S. Patent No. 6,829,587 B2, Control No. 95/001,068.

* cited by examiner

| | Pdt Daily Imp | Pdt Ctr | CpC | Pdt Conv | Rank Score |
|---|---|---|---|---|---|
| CP1 | 100 | 2% | $0.10 | 1% | 0.00004 |
| CP2 | 200 | 2% | $1.00 | 2% | 0.0016 |
| CP3 | 300 | 1% | $0.50 | 2% | 0.0003 |
| CP4 | 400 | 1% | 0.60% | 1% | 0.00024 |

350

| | Act Daily Imp | Act Ctr | Act CpC | Act Conv | Rank Score |
|---|---|---|---|---|---|
| CP3 | 200 | 2% | $0.50 | 2% | 0.0008 |
| CP2 | 100 | 1% | $1.00 | 1% | 0.0001 |
| CP4 | 350 | 2% | $0.10 | 2% | 0.00028 |

CONTENT ITEM PARAMETER FILTER

BACKGROUND

This disclosure relates to information retrieval.

Interactive media (e.g., the Internet) has great potential for improving the targeting of content items, e.g., advertisements, to receptive audiences. For example, some websites provide information search functionality that is based on keywords entered by the user seeking information. This user query can be an indicator of the type of information of interest to the user. By comparing the user query to a list of keywords specified by an advertiser, it is possible to provide targeted advertisements to the user. The targeted advertisements often times include text briefly describing the advertisement. An advertisement for may also include a "creative" that includes text, graphics and/or audio associated with the advertised service or product. This ad content of the creative is rendered or presented to an end user. An example of such a system is AdWords™ offered by Google, Inc. (Mountain View, Calif.).

Managing the addition and removal of keywords and the creatives associated with each advertisement can result in an optimization of advertising revenue and/or quality, e.g., an overall click-through rate for advertisements. Some advertising systems allow advertisers to add and remove keywords and creatives to target their changing product. Other processes can also be used to select a subset of keywords and creatives to be associated with the advertisement of the advertiser.

SUMMARY

Disclosed herein are systems and methods of selecting and filtering parameters. In one implementation, a set of one or more candidate parameters associated with a content item is identified. A subset of the one or more candidate parameters is determined. Performance statistics associated with the one or more candidate parameters in the subset are monitored, and the set of one or more candidate parameters or the subset of the one or more candidate parameters are modified based on the performance statistics.

In another implementation, a subset of one or more candidate parameters associated with a content item is identified from a set of the one or more candidate parameters associated with the content item. Performance statistics associated with the one or more candidate parameters in the subset are monitored, and the set of one or more candidate parameters or the subset of the one or more candidate parameters are modified based on the performance statistics

DETAILED DESCRIPTION

Figure 1:
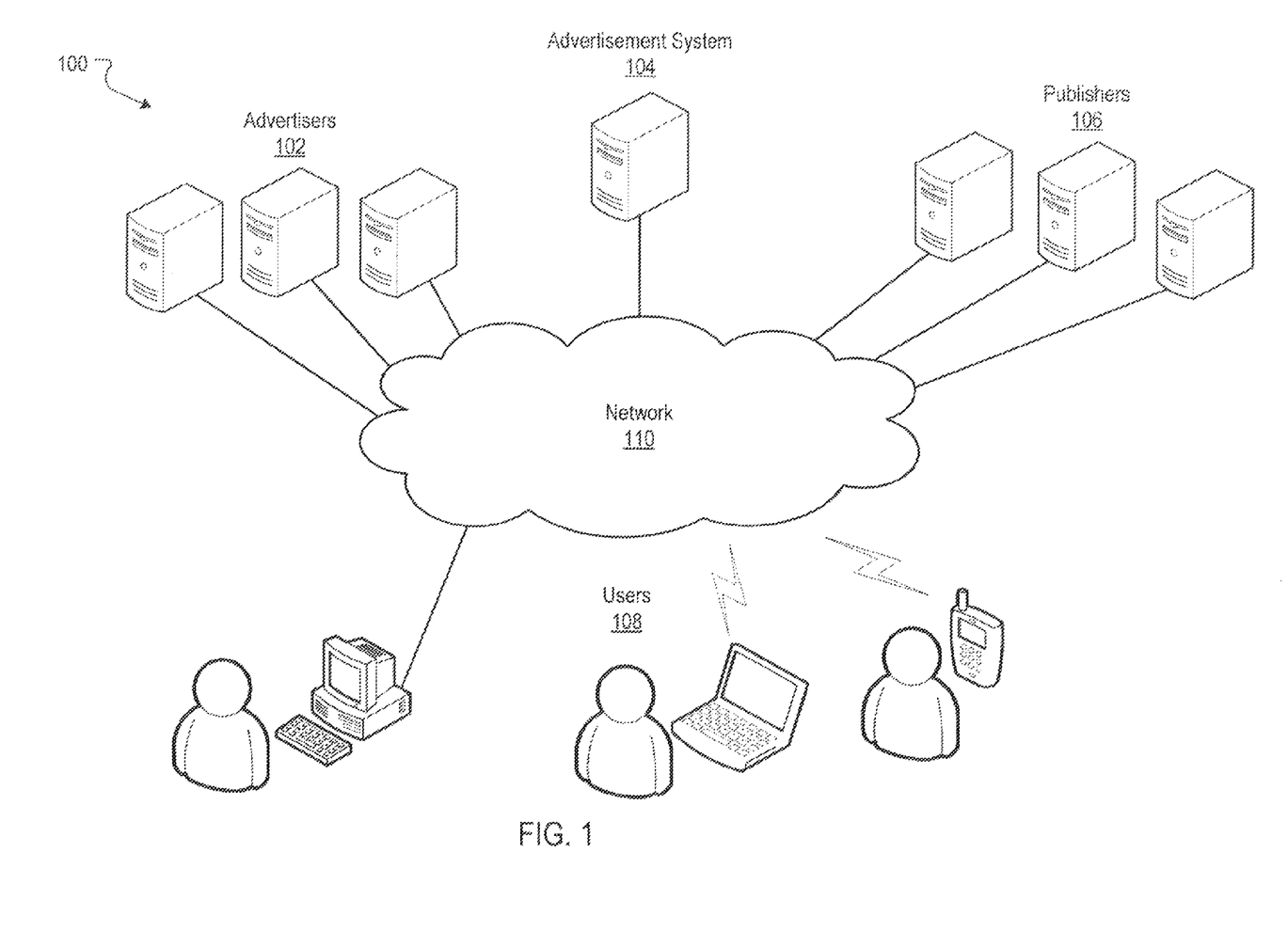
FIG. 1 is a block diagram of an implementation of an online advertising system.

FIG. 1 is a block diagram of an implementation of an online advertising system 100. In some implementations, one or more advertisers 102 can directly, or indirectly, enter, maintain, and track advertisement ("ad") information in an advertisement system 104. The advertisements may be in the form of graphical advertisements, such as banner advertisements, text only advertisements, image advertisements, audio advertisements, video advertisements, advertisements combining one of more of any of such components, etc. The advertisements may also include embedded information, such as a links, meta-information, and/or machine executable instructions. One or more publishers 106 may submit requests for advertisements to the system 104. The system 104 responds by sending advertisements (e.g., when the an associated publication is rendered) to the requesting publisher 106 for placement on one or more of the publisher's web properties (e.g., websites and other network-distributed content). While reference is made to advertisements, other content items can be provided by the system 104.

Other entities, such as users 108, the publishers 106, and the advertisers 102, can provide usage information to the system 104, such as, for example, whether or not an impression, conversion, or click-through related to an advertisement has occurred.

An "impression" is the number of times the page or pages containing the advertisement is shown to visitors. For example, an advertisement with an impression rate of 200/day means that the advertisement was shown 200 times in one day.

A click-through can occur, for example, when a user of a user device selects or "clicks" on an advertisement. The click-through rate can be a performance metric that is obtained by dividing the number of users that clicked on the advertisement or a link associated with the advertisement by the number of times the advertisement was delivered. For example, if an advertisement is delivered 100 times, and three persons clicked on the advertisement, then the click-through rate for that advertisement is 3%.

A "conversion" occurs when a user, for example, consummates a transaction related to a previously served advertisement. What constitutes a conversion may vary from case to case and can be determined in a variety of ways. For example, a conversion may occur when a user of the user device clicks on an advertisement, is referred to the advertiser's Web page, and consummates a purchase before leaving that Web page. In another example, a conversion may constitute a user clicking on an advertisement and completing is predefined action such as, for example, filling out an information form or remaining on the advertisers web pages for a particular period of time. Other conversion types can also be used. A conversion rate can, for example, be defined as the ratio of the number of conversions to the number of impressions of the advertisement (i.e., the number of times an advertisement is rendered) or the ratio of the number of conversions to the number of selections.

This usage information can include measured or observed user behavior related to advertisements that have been served. The system 104 performs financial transactions, such as crediting the publishers 106 and charging the advertisers 102 based on the usage information.

A computer network 110, such as a local area network (LAN), wide area network (WAN), the Internet, or a combination thereof, connects the advertisers 102, the system 104, the publishers 106, and the users 108.

One example of as publisher 106 is a general content server that receives requests for content (e.g., articles, discussion threads, music, video, graphics, search results, web page listings, information feeds, etc.), and retrieves the requested content in response to the request. The content server may submit a request for advertisements to an advertisement server in the system 104. The advertisement request may include a number of advertisements desired. The advertisement request may also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server can combine the requested content with one or more of the advertisements provided by the system 104. This combined content and advertisements can be sent to the user 108 that requested the content for presentation in a viewer (e.g., a browser or other content display system). The content server can transmit information about the advertisements back to the advertisement server, including information describing how, when, and/or where the advertisements are to be rendered (e.g., in HTML or JavaScript™). One example of such a system is the AdSense™ system provided by Google Inc. of Mountain View, Calif.

Another example publisher 106 is a search service. A search service can receive queries for search results. In response, the search service can retrieve relevant search results from an index of documents (e.g., from an index of web pages). An exemplary search service is described in the article S. Brin and L. Page, "The Anatomy of a Large-Scale Hypertextual Search Engine," Seventh International World Wide Web Conference, Brisbane, Australia and in U.S. Pat. No. 6,285,999, both of which are incorporated herein by reference each in their entirety. Search results can include, for example, lists of web page titles, snippets of text extracted from those web pages, and hypertext links to those web pages, and may be grouped into a predetermined number of (e.g., ten) search results.

The search service can submit a request for advertisements to the system 104. The request may include a number of advertisements desired. This number may depend on the search results, the amount of screen or page space occupied by the search results, the size and shape of the advertisements, etc. In some implementations, the number of desired advertisements will be from one to ten, or from three to five. The request for advertisements may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

The search service can combine the search results with one or more of the advertisements provided by the system 104. This combined information can then be forwarded to the user 108 that requested the content. The search results can be maintained as distinct from the advertisements, so as not to confuse the user between paid advertisements and presumably neutral search results.

Finally, the search service can transmit information about the advertisement and when, where, and/or how the advertisement was to be rendered back to the system 104.

As can be appreciated from the foregoing, the advertising management system 104 can serve publishers 106, such as content servers and search services. The system 104 permits serving of advertisements targeted to content (e.g., documents) served by content servers or in response to search queries provided by users. For example, a network or inter-network may include an advertisement server serving targeted advertisements in response to requests from a search service with advertisement spots for sale. Suppose that the inter-network is the World Wide Web. The search service crawls much or all of the content. Some of this content will include advertisement spots (also referred to as "inventory") available. More specifically, one or more content servers may include one or more documents. Documents may include web pages, email, content, embedded information (e.g., embedded media), meta-information and machine executable instructions and advertisement spots available. The advertisements inserted into advertisement spots in a document can vary each time the document is served or, alternatively, can have a static association with a given document.

In one implementation, the advertisement system 104 may include an auction process to select advertisements. Advertisers may be permitted to select one or more parameters associated with an advertisement. Advertisers can select an amount, or bid, the advertisers are willing to pay for each click of an advertisement, e.g., a cost-per-click amount an advertiser pays when, for example, a user clicks on an advertisement. In one implementation, the cost-per-click can include a maximum cost-per-click, e.g., the maximum amount the advertiser is willing to pay for each click of an advertisement. For example, advertisers A, B, and C all select, or bid, a maximum cost-per-click of $0.50, $0.75, and $1.00, respectively. The maximum amount advertiser A will pay for a click is $0.50, the maximum amount advertiser B will pay is $1.00, and the maximum amount advertiser C will pay is $0.75.

In one implementation, the advertisers may also be permitted to select one or more keywords and one or more creatives to associate with an advertisement. When a user performs a query with one of keywords specified by the advertiser 102, the advertisement of the advertiser 102 can be presented to the user along with the query results. The advertisement may also include a creative that includes text, graphics and/or audio selected by the user and associated with the advertised service or product. The advertisement content of the creative can also be presented to the user.

In some implementations, to maximize revenue for a given advertisement, the advertisement system 104 can filter parameters to select a subset of candidate parameters to associate with an advertisement instead of allowing the advertiser 102 to select the parameters. The subset of candidate parameters can be tested along with the advertisement and the actual parameters associated with the parameter without charging the advertiser to determine how well the candidate parameters perform. The candidate parameters can, for example, be used as actual parameters along with the advertisement if the candidate parameters perform well. For example, if advertiser A selects keywords "dog" and "show" to associate with advertiser A's advertisement, then every time the keywords "dog" and "show" are used in a query, advertiser A's advertisement can be rendered. If a user clicks on advertiser A's advertisement, advertiser A can be charged up to a maximum amount of $0.50 per click. Suppose, however, advertiser A's advertisement is associated with a candidate keyword "puppy" to determine how well the keyword "puppy" performs. If a user performs a query with the keyword "puppy," and advertiser A's advertisement is rendered, if the user clicks on advertiser A's advertisement, advertiser A may not be charged the $0.50 because the keyword "puppy" is a candidate parameter associated with the advertisement used only to determine how well the keyword performs.

Figure 2:
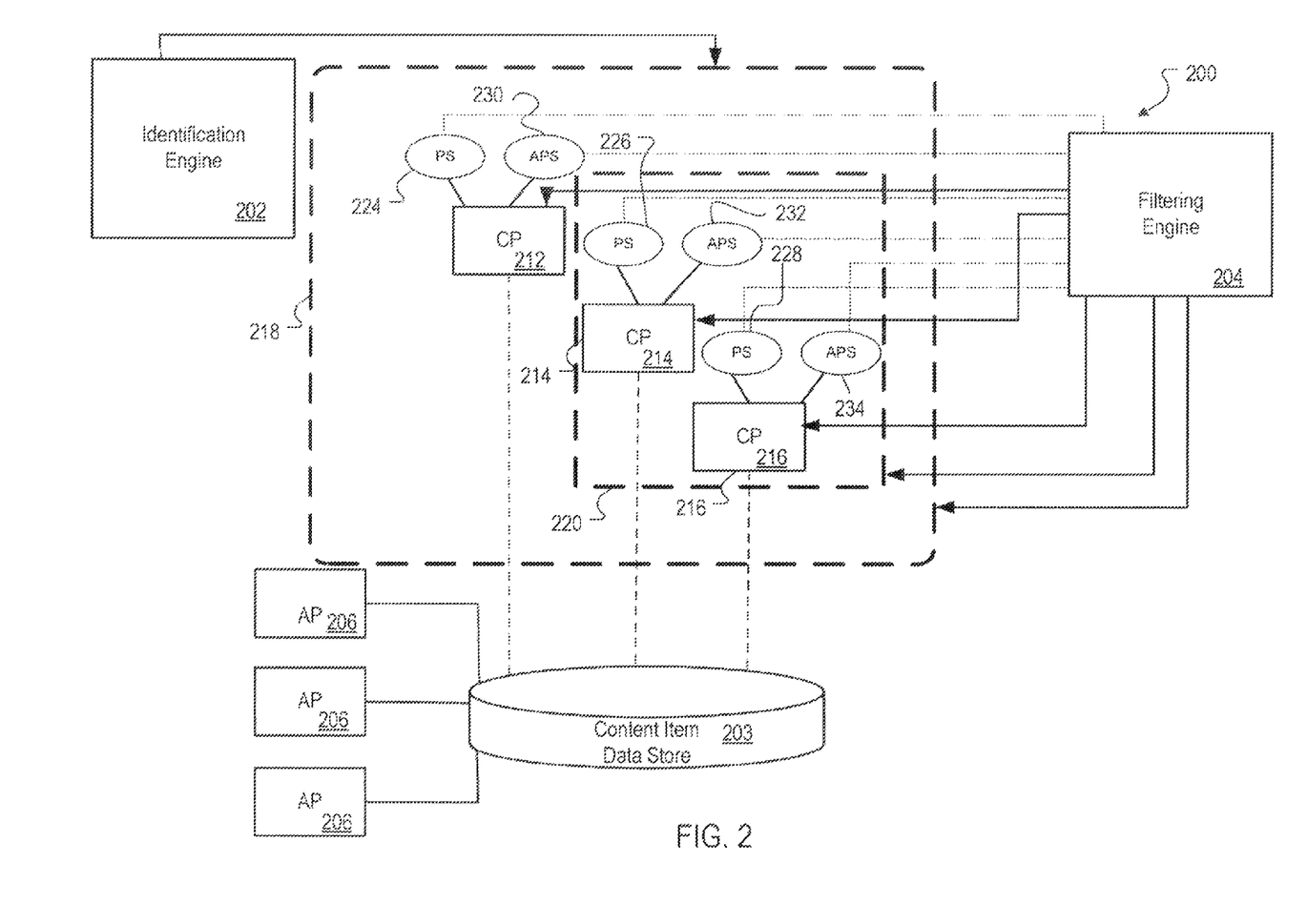
FIG. 2 is a block diagram of an example parameter filtering system.

FIG. 2. is a block diagram of an example parameter filtering system 200. The parameter filtering system 200 can, for example, be implemented in a computer device or one or more computer devices connected through a network, e.g., a local area network (LAN) or a wide area network (WAN), such as the Internet. The parameter filtering system 200 can, for example, be implemented in the advertisement system 104, which can be implemented in a computing system. The one or more computing devices can, for example, include memory devices storing processing instructions and processing devices for executing the processing instructions. An example computing system is shown and described with reference to FIG. 9. Other implementations, however, can also be used.

The parameter filtering system 200 can, for example, identify a subset of one or more candidate parameters to associate with a content item as actual parameters. The filtering system 200 can, for example, experiment with the subset of one or more candidate parameters to determine which candidate parameters perform well and then graduate these candidate parameters to become actual parameters to be associated with the content item. In one implementation, the actual parameters can be monitored and actual performance statistics can be gathered for these parameters.

The parameter filtering system 200 can, for example, include an identification engine 202, a content item data store 203, and a filtering engine 204. In one implementation, the content item data store 203 can comprise a unitary data store, such as a hard drive. In another implementation, the content data store 203 can comprise a distributed data store, such as a storage system that is distributed over a network. Other implementations, however, can also be used.

In one implementation, the content data store 203 can, for example, store one or more advertisements. Each advertisement in the content data store 203 can, for example, be associated with one or more actual parameters 206, 208, 210 and one or more candidate parameters 212, 214, 216. Each of the parameters 206, 208, 210, 212, 214, 216 can, for example, be associated with performance metrics, e.g., impressions, click-through rates, conversions, and bid metrics e.g., cost-per-clicks, etc. In one implementation, the parameter filtering system 200 can monitor and/or evaluate predicted performance statistics related to the content items in the content data store 203. For example, the predicted performance of each parameter in the content data store 203 can be evaluated based on a predicted performance metric associated with the parameter, such as a predicted click-through rate, a predicted conversion rate, or some other metric. In one implementation, the parameter filtering system 200 can monitor and/or evaluate actual performance data related to the content items in the content data store 203. For example, the actual performance of each parameter associated with each content item in the content data store 203 can be evaluated based on an actual performance metric associated with the advertisement, such as an actual click-through rate, an actual conversion rate, or some other metric.

Other performance and bid metrics can also be used, such as dwell time at a landing page, etc. The performance and bid metrics can, for example, be revenue related or non-revenue related. In another implementation, the performance and bid metrics can be parsed according to time, e.g., the performance of a particular content item may be determined to be very high on weekends, moderate on weekday evenings, but very low on weekday mornings and afternoons, for example. The performance and bid metrics can be actual metrics or predicted metrics.

In one implementation, the identification engine 202 can, for example, identify a set 218 of one or more candidate parameters 212, 214, 216 associated with a content item. The candidate parameters 212, 214, 216 can, for example, include one or more candidate keywords associated with a content item. In one implementation, the candidate parameters 212, 214, 216 can, for example, include one or more candidate creatives associated with a content item. The content item can, for example, include an advertisement and the one or more candidate parameters can include one or more candidate keywords associated with the advertisement.

The identification engine 202 can, for example, identify the set 218 of one or more candidate parameters 212, 214, 216 based a landing page associated with the content item, existing creatives and keywords associated with the content item, negative keywords associated with the content item, targeting information associated with the content item, and/or an advertiser's budget associated with the content item.

In one implementation, the filtering engine 204 can, for example, determine a subset 220 of the one or more candidate parameters 212, 214, 216. The filtering engine 204 can, for example, use one or more performance statistics associated with each of the one or more candidate parameters 212, 214, 216 to determine the subset 220.

The performance statistics can, for example, include an impression associated with the candidate parameter, a click-through rate associated with the candidate parameter, a cost-per click associated with the candidate parameter, or a conversion associated with the candidate parameter. For example, if a candidate parameter is a candidate keyword "X," then the impression associated with the candidate keyword "X" could be the number of times an advertisement was shown after a user performed a query with the keyword "X."

In one implementation, the performance statistics can, for example, include predicted performance statistics associated with the one or more candidate parameters 212, 214, 216, respectively. The predicted performance statistics can, for example, be based on how a candidate parameter may perform if the candidate parameter was used with the content item. The filtering engine 204 can, for example, determine the predicted performance statistics 224, 226, 228 of the candidate parameters 212, 214, 216 based on one or more aspects of a content item associated with the candidate parameter In one implementation, the performance statistics can, for example, include actual performance statistics 230, 232, 234 in addition to or alternatively to the predicted performance statistics. The actual performance statistics 230, 232 234 can, for example, be based on the performance statistics associated with the candidate parameter once it has been used with the content item, as will be described in greater detail below.

In one implementation, the filtering engine 204 can, for example, determine the subset 220 of one or more candidate parameters 212, 214, 216 by ranking the one or more candidate parameters 212, 214, 216 in the set 218 and selecting one or more of the ranked candidate parameters. The filtering engine 202 can, for example, rank the one or more candidate parameters in the set 218 based on the predicted performance statistics associated with each of the candidate parameters 212, 214, 216. The filtering engine 202 can, for example, calculate a rank score for each of the candidate parameters 212, 214, 216 based on the predicted performance statistics 228, 230, 232. The rank score can, for example, be calculated according to the formula:

$$R\_parameter=(CTR\_par\_pre^2 * IMP\_par\_pre) * CON\_RATE\_par\_pre * CPC\_par\_pre$$

where R_parameter is the rank score of the parameter, CTR_par_pre is the predicted click-through raw associated with the parameter, IMP_par_pre is the predicted impression associated with the parameter, CON_RATE_par_pre is the predicted conversion rate associated with the keyword, and CPC_par_pre is the predicted cost-per-click associated with the keyword. The filtering engine 204 can, for example, select one or more of the candidate parameters 212, 214, 216 from the set 218 to include in the subset 220 based on the rank score of each of the candidate parameters 212, 214, 216.

In one implementation, the filtering engine 204 can, for example, monitor actual performance statistics associated with the one or more candidate parameters 214, 216 in the subset 220. The filtering engine 204 can, for example, associate the subset 220 of the one or more candidate parameters 214, 216 with the content item to monitor the actual performance statistics 230, 232, 234. In one implementation, the advertiser 102 associated with the content item, e.g., advertisement, may not be charged for the candidate parameter being associated and used along with the content item. The candidate parameter can, for example, be used for experimental purposes to determine how well the candidate parameter may perform.

The subset 220 of candidate parameters 212, 214, 216 can, for example, be monitored along with the actual parameters 230, 232, 234 associated with a content item. For example, if the candidate parameter is a candidate keyword for an advertisement, the candidate keyword can be monitored along with other actual keywords that are already associated with the advertisement. If a user performs a query with the candidate keyword and the advertisement associated with the keyword is rendered, then various actual performance statistics associated with the candidate keyword can be monitored. If a user clicks on the advertisement, then the actual click-through rate of the candidate keyword can change and be monitored. If a user clicks on the advertisement and subsequently makes a purchase, then the actual conversion rate associated with the keyword can change and be monitored. In one implementation, if a click-through or conversion occurs associated with the candidate parameter, the advertiser 102 may not be charged the cost-per click amount the advertiser 102 would be charged if an actual parameter was the cause of the conversion or click-through. For example, suppose an advertiser 102 agrees to pay $0.10 per click of an advertisement. The advertiser 102 selects the keyword "cat" as an actual keyword, and the filtering engine 204 selects "kitten" as a candidate keyword. The filtering engine 204 can monitor the performance statistics candidate keyword "kitten" along with the performance statistics of the actual keyword "cat." If a user performs a query with the keyword "kitten," and the advertiser's advertisement is rendered, a click on that advertisement would normally cost the advertiser the cost-per click amount of $0.10. However, because a candidate keyword was used to initiate the click, the advertiser 102 is not charged the $0.10 cost-per-click amount.

In one implementation, the filtering engine 204 can, for example, evaluate the actual performance statistics 230, 232, 234 to determine if one or more of the actual performance statistics 230, 232, 234 fall below a threshold. The filtering engine 204 can, for example, determine whether a click-through rate associated with a keyword falls below a threshold value "x." For example, a candidate keyword may be used by a user, but the advertisement associated with the keyword may never get clicked on (i.e., selected) by the user. Therefore, the click-through rate of that keyword may fall below a threshold.

In one implementation, the filtering engine 204 can modify the set 218 of the one or more candidate parameters 212, 214, 216 or the subset 220 of the one or more candidate parameters 212, 214, 216 based on the monitoring of the actual performance statistics 230, 232, 234. The filtering engine 204 can, for example, rank the one or more candidate parameters 214, 216 in the subset 220 based on the actual performance statistics 232, 234 associated with each one of the candidate parameters 214, 216. The filtering engine 204 can, for example, calculate a rank score for each of the candidate parameters 214, 216 in the subset 218 based on the actual performance statistics 232, 234. The rank score can, for example, be calculated according to the formula:

$$R\_parameter=(CTR\_par\_act^2 * IMP\_par\_act) * CON\_RATE\_par\_act * CPC\_par\_act$$

where R_parameter is the rank score, CTR_par_act is the actual click-through rate associated with the parameter, IMP_par_act is the actual impression associated with the parameter, CON_RATE_par_act is the actual conversion rate associated with the keyword, and CPC_par_act is the actual cost-per-click associated with the keyword.

The filtering engine 204 can, for example, modify the set 218 of one or more candidate parameters 212, 214, 216 or the subset 220 of the one or more candidate parameters 214, 216 based on the calculated rank score. The filtering engine 204 can evaluate the suitability of the candidate parameters 214, 216 by calculating the rank score for each candidate parameter 214, 216 and modifying the set 218 or subset 220 based on the evaluation and/or rank score.

In one implementation, the filtering engine 204 can, for example, determine whether enough statistics exist to determine whether any of the candidate parameters 214, 216 should be deleted from the subset 220. If, for example, the candidate parameter was a candidate keyword, and the candidate keyword was never used by a user in a query, then no actual performance statistics exist relating to the candidate keyword. The candidate parameter can, for example, be kept in the subset 220 until actual performance statistics can be gathered for the candidate parameter to determine how well the parameter performs. In one implementation, the filtering engine 204 can delete the candidate parameter from the subset 220 and the set 218 it a certain amount of days pass and the candidate parameter is never used by a user in a query. For example, if after 30 days a candidate keyword is not used, then the candidate keyword can be deleted from both the subset 220 and the set 218.

In one implementation, the filtering engine 204 can, for example, delete one or more of the candidate parameters 214, 216 in the subset 220. The filtering engine 204 can, for example, delete all but the top ranking candidate parameters after the rank score is determined as described above using the actual performance statistics 230, 232, 234. For example, the filtering engine 204 can, for example, delete the lowest ranking candidate parameter from the subset 220 or the set 218.

In another implementation, the filtering engine 204 can, for example, delete one or more candidate parameters 214, 216 from the subset 220 using one or more of the actual performance statistics 232, 234. For example, the filtering engine 204 can delete any candidate parameter from the subset 220 that had a click-through rate below 50%. In another example, the filtering engine 204 can delete any candidate parameter that had less than 400 impressions.

In one implementation, the filtering engine 204 can, for example, delete any poor performing parameters from the subset 220 and/or the set 218. The filtering engine 204 can, for example, compare the click-through rate and the cost-per click associated with each candidate parameter in the subset 220 and delete any candidate parameter where the product of the cost-per click and click-through rate falls below a threshold. The threshold can, for example, be an integer, (e.g., 2, 3, 4) or non-integer value (e.g., 5.25). The threshold value of can be adjusted based on historical data and simulations associated with the candidate parameter and the content item associated with the candidate parameter.

In one implementation, if the filtering engine 204 deletes a candidate parameter from the subset 220, the filtering engine 204 can also delete the same candidate parameter from the set 218. In one implementation the filtering engine 204 can, for example, also delete any related candidate parameters to a previously deleted candidate parameter from the subset 220 and the set 218. A related parameter can, for example, include the plural form of the deleted candidate parameter, or a misspelled version of the candidate parameter. For example, if the filtering engine 204 removes the candidate keyword "dog" from the subset 220, then the filtering engine 204 can also remove the words "dog," and "dawg" from the subset 220 and the set 218.

In one implementation, the filtering engine 204 can, for example, re-rank the one or more candidate parameters 214, 216 in the subset 220. The candidate parameters in the subset 220 can, for example, be re-ranked because originally not enough data existed to determine whether one or more of the candidate parameters performed poorly.

In one implementation, the filtering engine 204 can, for example, add one or more candidate parameters 212, 214, 216 from the set 218 to the subset 220. One or more candidate parameters can 212, 214, 216, for example, be added to the subset 220 after one or more candidate parameters 214, 216 get deleted from the subset 220.

In one implementation, the filtering engine 204 can, for example, determine that one or more of the candidate parameters 214, 216 in the subset 220 can be associated with the content item as one or more actual parameters 206, 208, 210. For example, one or more candidate parameters may have performed above a threshold or may have a certain rank score, causing the filtering engine 204 to identify the candidate parameters as good actual parameters. The filtering engine 204 can, for example, expose these candidate parameters to the advertiser 102. The advertiser 102 can, for example, decide to use the candidate parameters that are selected as actual parameters.

For example, suppose actual performance statistics are monitored for a candidate keyword "cat." The filtering engine can monitor the actual cost-per click, actual click-through rate, actual impression, and actual conversion rate associated with the candidate keyword "cat" and determine whether a rank score of the keyword "cat," as determined by a formula, is high enough to graduate the candidate keyword "cat" to be an actual keyword. The filtering engine 204 can, for example, use the formula:

$$R\_parameter=(CTR\_par\_act^2*IMP\_par\_act)*CON\_RATE\_par\_act*CPC\_par\_act$$

The filtering engine 204 can, for example, set a threshold and if the rank score is above the threshold, the candidate keyword "cat" has performed well enough to be graduated to an actual keyword. The filtering engine 204 can, for example, use one or more of the actual performance statistics of the candidate keyword "cat" to make the determination of whether to graduate the candidate keyword cat to an actual keyword.

In one implementation, the filtering engine 204 can, for example, deliver the content item based on a match between a query and one or more actual parameters. The actual parameters can, for example, include one or more candidate parameters that perform well as determined by the filtering engine 204.

In one implementation, the filtering engine 204 can, for example, deliver the content item based on a match between a content request and one or more actual parameters. Another form of online advertising is ad syndication, which allows advertisers to extend their marketing reach by distributing ads to additional partners. For example, a publisher 106 can place an advertiser's text or image ads on web properties with desirable content to drive online customers to the advertiser's website. An example of such a system is AdSense™ offered by Google, Inc. The content request can, for example, be received from a publisher 106 and a content item can be delivered to the publisher 106 based on a match between the content request and the one or more actual parameters.

Figure 3:
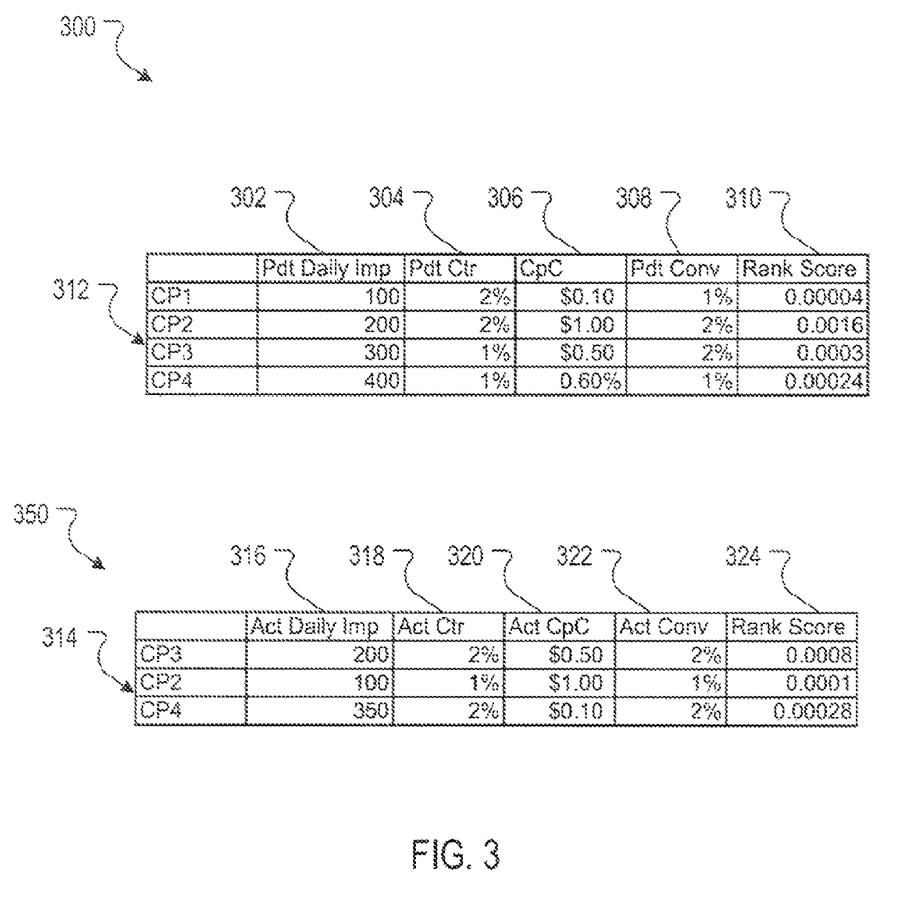
FIG. 3 is an example parameter selecting and filtering table.

FIG. 3 is an example of two filtering tables 300 and 350 of candidate keyword parameters for an advertisement. Although the ranking tables 300 and 350 refer to candidate keyword parameters for an advertisement, other parameters and content items can be used. For example, the table can filter and rank candidate creative parameters for content items such as video and audio files.

The tables 300 and 350 illustrate the association of multiple candidate keyword parameters, e.g., CP1, CP2, CP3, and/or CP4 and a ranking 310, 324 of one or more of those candidate keyword parameters. Each of the candidate keyword parameters CP1, CP2, CP3, and CP4 in table 300 is associated with a predicted impression rate 302, a predicted click-through rate 304, a predicted cost-per click 306, and a predicted conversion rate 308. In one implementation, the identification engine 202 can, for example, identify a set 312 of the one or more candidate keyword parameters CP1, CP2, CP3, and CP4.

In one implementation, a subset 314 can be determined by the filtering engine 204. The filtering engine 204 can, for example, determine a rank score 310 for the candidate keyword parameters CP1, CP2, CP3, and CP4 based on the predicted impression rate 302, a predicted click-through rate 304, a predicted cost-per click 306, and a predicted conversion rate 308. For example, the rank score can be calculated by the filtering engine 204 using the formula:

$$R\_parameter=(CTR\_par\_pre^2*IMP\_par\_pre)*CON\_RATE\_par\_pre*CPC\_par\_pre$$

The rank score 310 of CP1 is calculated as $(0.02^2*100)*0.01*0.1=0.00004$. The rank score 310 of CP2 is calculated as $(0.02^2*200)*0.02*1=0.0016$. The rank score 310 of CP3 is calculated as (0.01^2*300)*0.02*0.5=0.0003, and the rank score 310 of CP4 is calculated as (0.01^2*400)*0.01*0.6=0.00024.

In the example of FIG. 3, the rank score 310 of the candidate keyword parameter CP2 is higher than the rank score of candidate keyword parameter CP1, CP3 and CP4. Accordingly, the candidate keyword parameter CP2 is ranked higher than the candidate keyword parameters CP1, CP3, and CP4 and thus may be displayed in a prominent position with respect to CP1, CP3, and CP4.

The filtering engine 204 can, therefore, rank the candidate keyword parameters with CP2 first, CP3 second, CP4 third, and CP1 fourth. The filtering engine 204 can, for example, select the subset 314 based on the rank score 310 of the candidate keyword parameters.

Suppose the filtering engine 204 selected the top three ranked candidate keyword parameters CP3, CP2, and CP4 for the subset 314. The filtering engine 204 can, for example, associate each of the candidate parameters CP3, CP2, and CP4 with an advertisement, and monitor the actual performance statistics associated with each of the candidate parameters CP3, CP2, and CP4 to determine how well each parameter performs. The filtering engine 204 can, for example, determine a second rank score 324 based on the actual the impression rate 316, an actual click-through rate 318, an actual cost-per click 320, and an actual conversion rate 322 of each of the candidate keyword parameters CP3, CP2, and CP1.

The second rank score 324 can, for example, be calculated using the formula:

$$R\_parameter = (CTR\_par\_act^2 * IMP\_par\_act) * CON\_RATE\_par\_act * CPC\_par\_act$$

where R_parameter is the rank score, CTR_par_act is the actual click-through rate associated with the parameter, IMP_par_act is the actual impression associated with the parameter, CON_RATE_par_act is the actual conversion rate associated with the keyword, and CPC_par_act is the actual cost-per-click associated with the keyword.

The rank score 324 of CP3 is calculated as (0.02^2*200)*0.02*0.5=0.0008. The rank score 324 of CP2 is calculated as (0.01^2*100)*0.01*1=0.0001, and the rank score 324 of CP4 is calculated as (0.02^2*350)*0.02*0.1=0.00028.

The filtering engine 204 can, for example, modify the set 312 or the subset 314 of candidate keyword parameters CP1, CP2, CP3, and CP4 according to the rank score 324. For example, the filtering engine can delete the lowest ranking candidate keyword parameter CP2 from the subset 314 and the set 312.

In one implementation, the filtering engine 204 can delete one or more candidate keyword parameters based on one or more of the actual performance statistics 316, 318, 320, and 322. For example, the filtering engine 204 can delete any candidate parameter that had an actual click-through rate 318 that performed below a threshold, e.g., 1.5%. Therefore, the filtering engine 204 can delete CP2 from the subset 314 of candidate parameters.

In one implementation, the filtering engine 204 can, for example, delete the candidate parameter from both the set 312 and subset 314. For example, if the filtering engine 204 deleted CP2 from the subset 314, the filtering engine 302 can also delete CP2 from the set 312.

Figure 4:
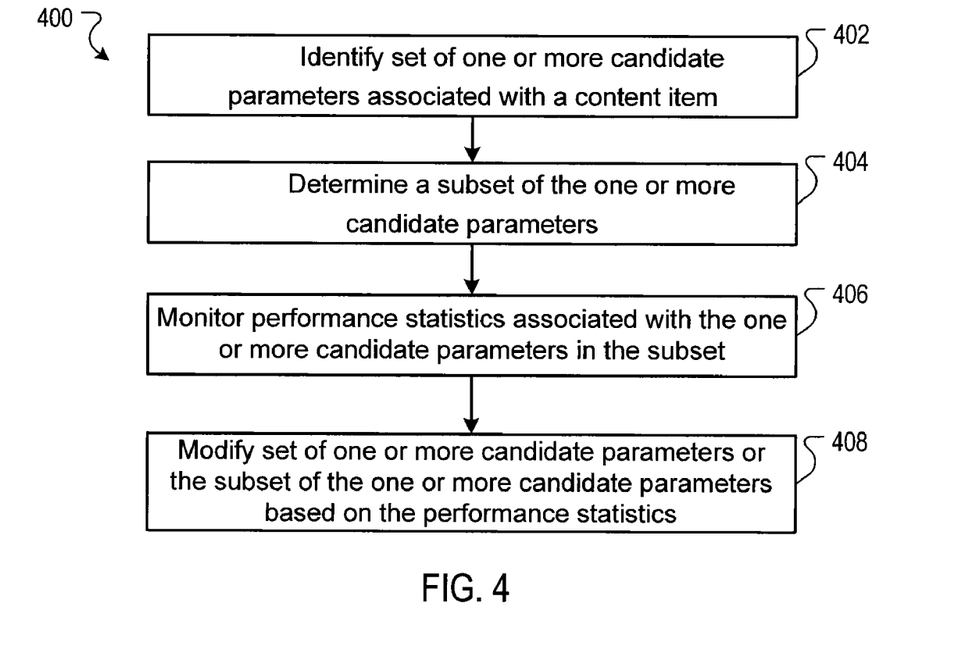
FIG. 4 is a flow diagram of an example process for filtering parameters.

FIG. 4 is a flow diagram of an example process 400 for filtering parameters. The process 400 can, for example, be implemented in a system such as the parameter filtering system 200 of FIG. 2. Stage 402 identifies a set of one or more candidate parameters associated with a content item. For example, the identification engine 202 identifies as set of one or more candidate parameters associated with a content item. Stage 404 determines a subset of the one or more candidate parameters. For example, the filtering engine 204 can determine a subset of the one or more candidate parameters. Stage 406 monitors performance statistics associated with the one or more candidate parameters in the subset. For example, the filtering engine 204 can monitor performance statistics associated with the one or more candidate parameters in the subset. Stage 408 modifies the set of one or more candidate parameters or the subset of the one or more candidate parameters based on the performance statistics.

Figure 5:
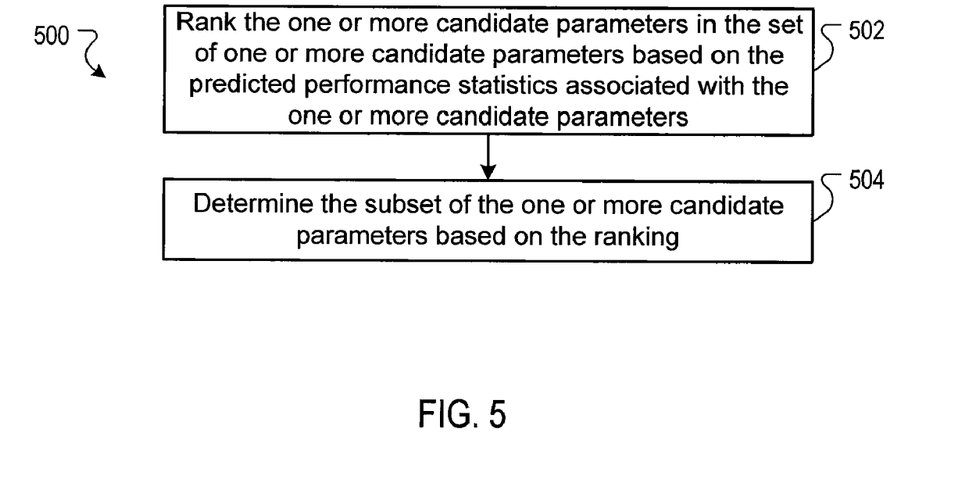
FIG. 5 is an example process for determining a subset of candidate parameters.

FIG. 5 is an example process 500 for determining a subset of candidate parameters. The process 500 can, for example, be implemented in a system such as the parameter filtering system 200 of FIG. 2.

Stage 502 ranks the one or more candidate parameters in the set of one or more candidate parameters based on the predicted performance statistics associated with the one or more candidate parameters. For example, the filtering engine 204 can rank the one or more candidate parameters in the set of one or more candidate parameters used on the predicted performance statistics associated with the one or more candidate parameters. Stage 504 determines the subset of the one or more candidate parameters based on the ranking. For example, the filtering engine 204 can determine the subset of the one or more candidate parameters based on the ranking.

Figure 6:
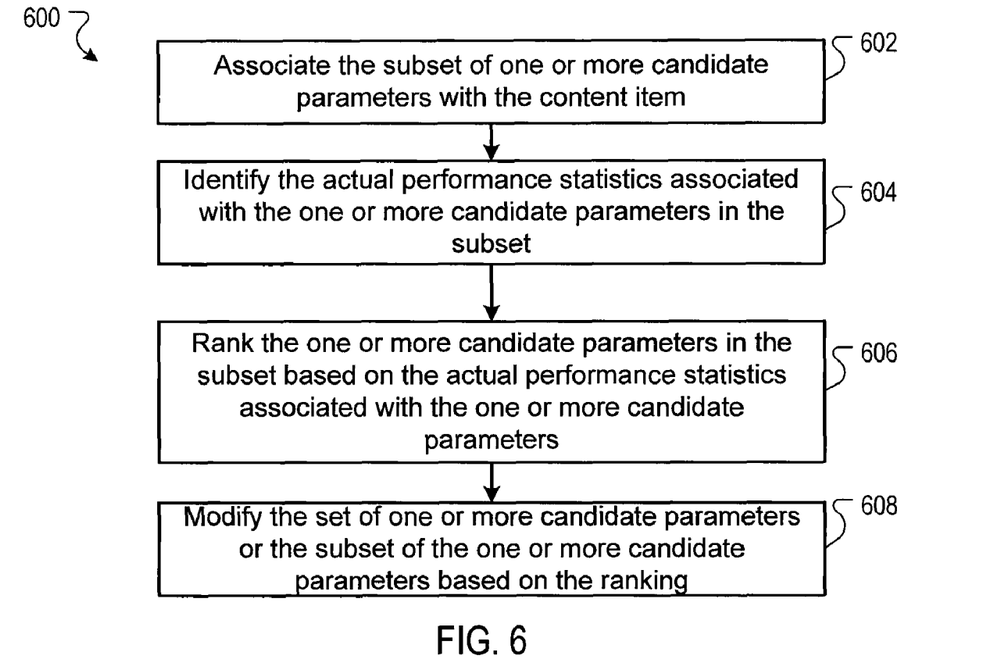
FIG. 6 is an example process for monitoring performance statistics.

FIG. 6 is an example process 600 for monitoring performance statistics. The process 600 can, for example, be implemented in a system such as the parameter filtering system 200 of FIG. 2. Stage 602 associates the subset of one or more candidate parameters with the content item. For example, the filtering engine 204 can associate the subset of one or more candidate parameters with the content item. Stage 604 retrieves the performance statistics associated with the content item. For example, the filtering engine 204 can retrieve the performance statistics associated with the content item. Stage 606 ranks the one or more candidate parameters in the subset based on the actual performance statistics associated with the one or more candidate parameters. For example, the filtering engine 204 can rank the one or more candidate parameters in the subset based on the actual performance statistics associated with the one or more candidate parameters. Stage 608 modifies the set of one or more candidate parameters or the subset of the one or more candidate parameters based on the ranking. For example, the filtering engine 204 can modify the set of one or more candidate parameters or the subset of the one or more candidate parameters based on the ranking.

Figure 7:
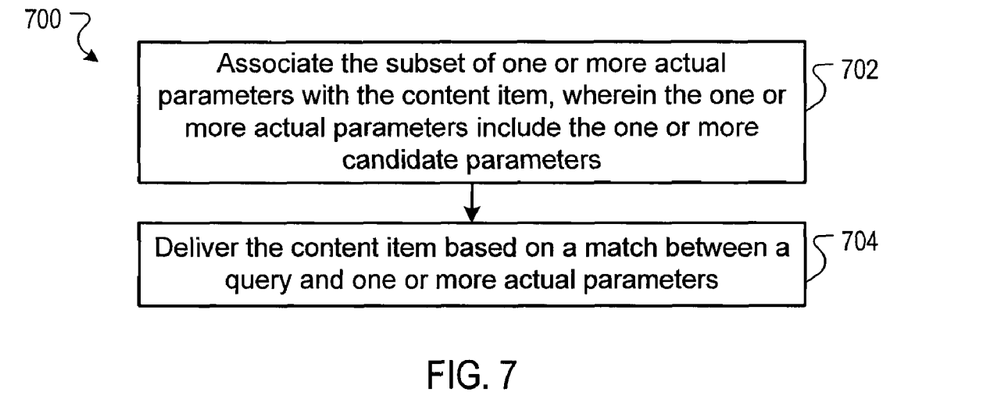
FIG. 7 is an example process for identifying candidate parameters.

FIG. 7 is an example process 700 for identifying candidate parameters. The process 700 can, to example, be implemented in a system such as the parameter filtering system 200 of FIG. 2. Stage 702 associates the subset of one or more actual parameters with the content item, wherein the one or more actual parameters include the one or more candidate parameters. For example, the filtering engine 204 can associate the subset of one or more actual parameters with the content item, wherein the one or more actual parameters include the one or more candidate parameters. Stage 704 delivers the content item based on a match between a query and one or more actual parameters. For example, the filtering engine 204 can deliver the content item based on a match between a query and one or more actual parameters.

Figure 8:
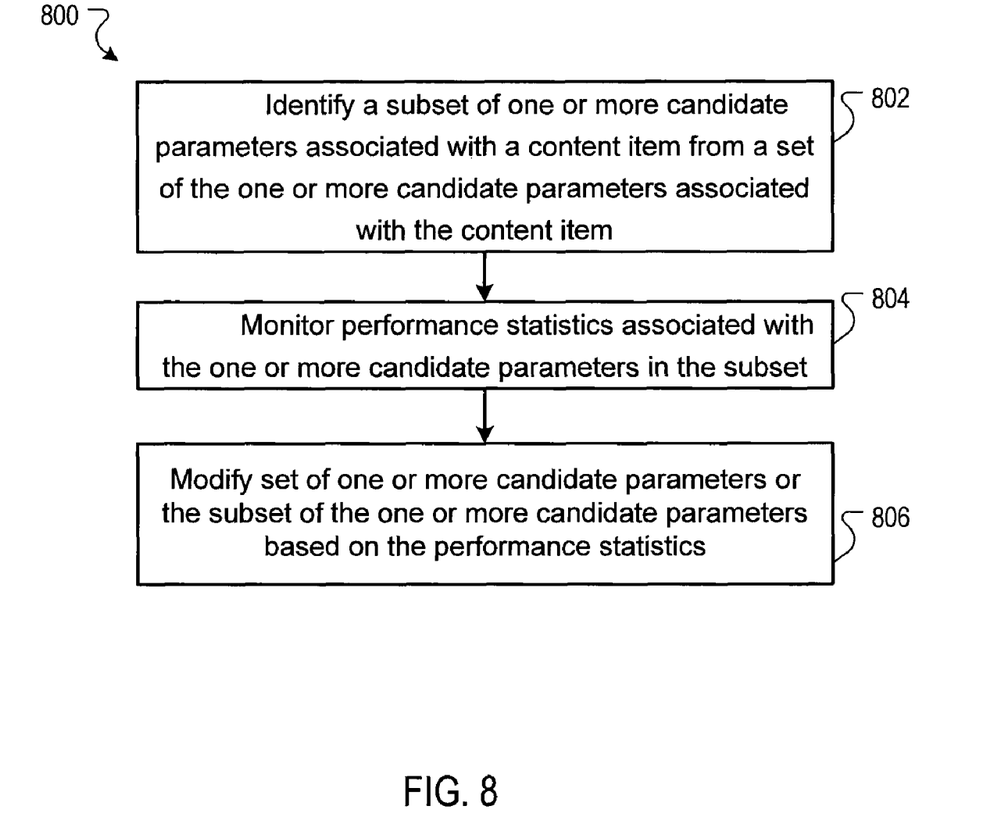
FIG. 8 is another example process for filtering parameters.

FIG. 8 is another example process 800 for filtering parameters. The process 800 can, for example, be implemented in a system such as the parameter filtering system 200 of FIG. 2.

Stage 802 identifies a subset of one or more candidate parameters associated with a content item from a set of the one or more candidate parameters associated with the content item. For example, the filtering engine 204 can identify a subset of one or more candidate parameters associated with a content item from a set of the one or more candidate parameters associated with the content item.

Stage 804 monitors performance statistics associated with the one or more candidate parameters in the subset. For example, the filtering engine 204 can monitor performance statistics associated with the one or more candidate parameters in the subset.

Stage 806 modifies the set of one or more candidate parameters or the subset of the one or more candidate parameters based on the performance statistics. For example, the filtering engine 204 can modify the set of one or more candidate parameters or the subset of the one or more candidate parameters based on the performance statistics.

Figure 9:
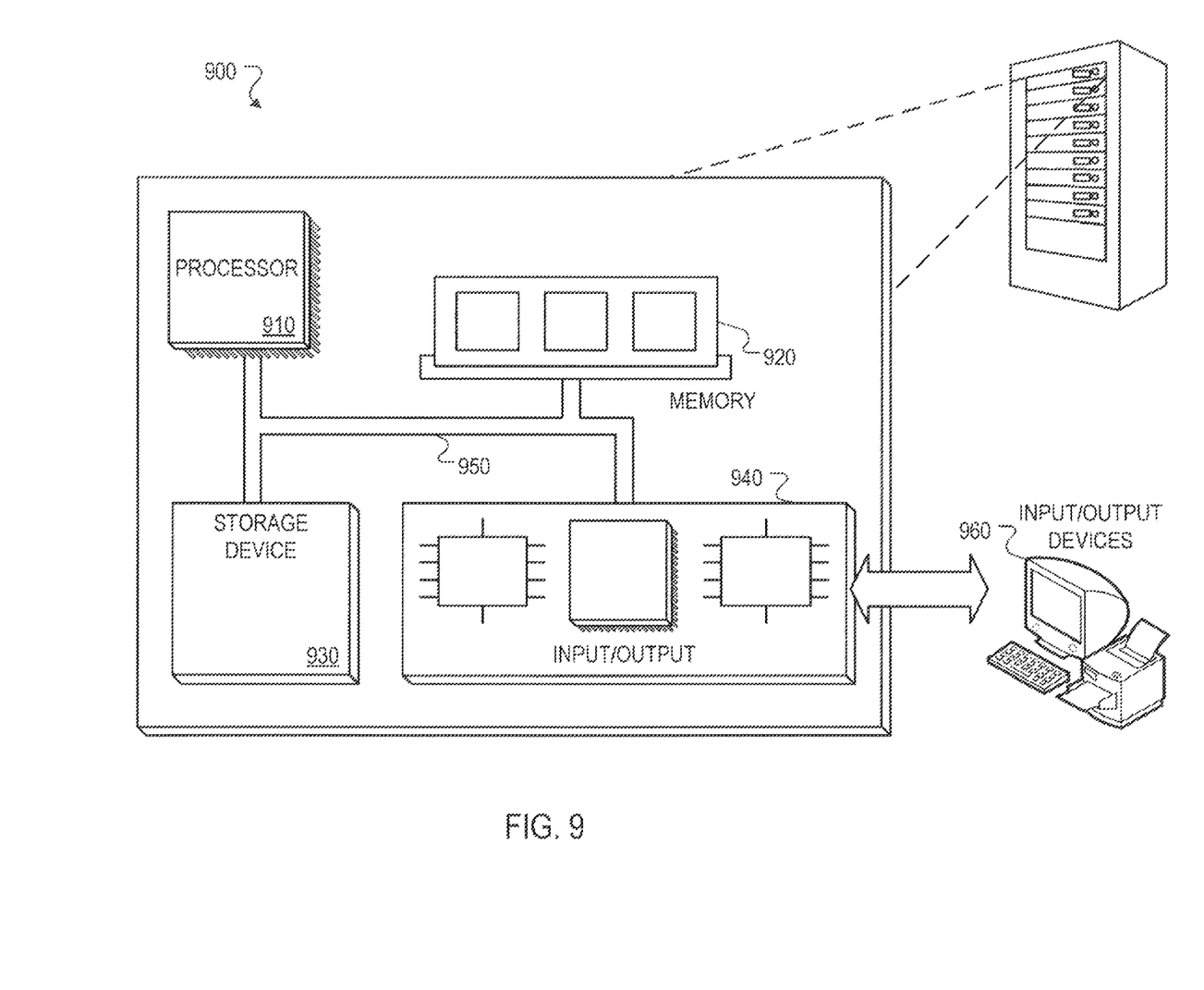
FIG. 9 is a schematic diagram of an example computer system that can be utilized to implement the systems and methods described herein.

FIG. 9 is block diagram of an example computer system 900. The system 900 includes a processor 910, a memory 920, a storage device 930, and an input/output device 940. Each of the components 910, 920, 930, 940 can, for example, be interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 can, for example, include a hard disk device, an optical disk device, or some other large capacity storage device.

The input/output device 940 provides input/output operations for the system 900. In one implementation, the input/output device 940 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 960. Other implementations, however, can also be used, such as mobile computing devices, mobile communication devices, set-top box television client devices, etc.

Although the above description refers to a content item such as an advertisement, content items such as video and/or audio files, web pages for particular subjects, news articles, etc. can also be used. For example, if a user clicks on a video file, then the owner or publisher of the video file can also generate revenue every time a use clicks on the video file. A threshold measure can also be determined for the video file according to one or more parameters associated with the video file, e.g., a click-through rate and/or a cost-per-click of the video file.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method comprising:
receiving a selection of one or more advertiser keywords, from an advertiser, to associate with an advertisement;
automatically identifying one or more candidate keywords to associate with the advertisement, wherein the advertisement is associated with a cost and the one or more candidate keywords are different from the one or more advertiser keywords;
associating the one or more candidate keywords and the one or more advertiser keywords with the advertisement;
providing the advertisement in response to first content requests, wherein:
when the one or more candidate keywords satisfy a first content request without the one or more advertiser keywords satisfying the first content request, not charging the advertiser the cost upon a presentation or selection or conversion of the advertisement and;
when the one or more advertiser keywords satisfy the first content request without the one or more candidate keywords satisfying the first content request, charging the advertiser the cost upon a presentation or selection or conversion of the advertisement;
monitoring performance statistics associated with the one or more candidate keywords associated with the advertisement provided in response to the first content requests;
identifying a subset of the one or more candidate keywords based on the monitored performance statistics, wherein each candidate keyword in the identified subset performs better than a predetermined threshold;
graduating, by one or more computers, the subset of candidate keywords for inclusion in a set of actual keywords, wherein the set of actual keywords includes at least one of the one or more advertiser keywords and at least one candidate keyword in the identified subset;
associating the set of actual keywords with the advertisement; and
subsequent to the graduation, providing the advertisement in response to second content requests, wherein when any keyword in the set of actual keywords satisfy a second content request, charging the advertiser the cost upon a presentation or selection or conversion of the advertisement.

2. The method of claim 1, further comprising:
identifying one or more candidate creatives to include in the advertisement;
determining a subset of the one or more candidate creatives; and associating the subset of the one or more candidate creatives with the advertisement.

3. The method of claim 1, wherein the performance statistics are actual performance statistics.

4. The method of claim 1, wherein the performance statistics are predicted performance statistics.

5. The method of claim 1, wherein the performance statistics comprise at least one of an impression associated with the one or more candidate keywords, a cost-per click associated with the one or more candidate keywords, a click or a conversion associated with the advertisement.

6. The method of claim 3, wherein the monitoring comprises:
evaluating the actual performance statistics to determine if one or more performance statistics performed below a threshold.

7. The method of claim 1, wherein identifying a subset of the one or more candidate keywords comprises:
ranking the one or more candidate keywords based on actual performance statistics associated with the one or more candidate keywords; and
identifying candidate keywords in the subset based at least in part on the ranking.

8. The method of claim 7, wherein identifying a subset of the one or more candidate keywords comprises:
modifying the subset of the one or more candidate keywords based at least in part on the ranking.

9. The method of claim 8, wherein the modifying comprises:
re-ranking the one or more candidate keywords.

10. A system, comprising:
one or more computers; and
a computer-readable medium coupled to the one or more computers having instructions stored thereon which, when executed by the one or more computers, cause the one or more computers to perform operations comprising:
receiving a selection of one or more advertiser keywords, from an advertiser, to associate with an advertisement;
automatically identifying one or more candidate keywords to associate with the advertisement, wherein the advertisement is associated with a cost and the one or more candidate keywords are different from the one or more advertiser keywords;
associating the one or more candidate keywords and the one or more advertiser keywords with the advertisement;
providing the advertisement in response to first content requests, wherein:
when the one or more candidate keywords satisfy a first content request without the one or more advertiser keywords satisfying the first content request, not charging the advertiser the cost upon a presentation or selection or conversion of the advertisement and;
when the one or more advertiser keywords satisfy the first request without the one or more candidate keywords satisfying the first content request, charging the advertiser the cost upon a presentation or selection or conversion of the advertisement;
monitoring performance statistics associated with the one or more candidate keywords associated with the advertisement provided in response to the first content requests;
identifying a subset of the one or more candidate keywords based on the monitored performance statistics, wherein each candidate keyword in the identified subset performs better than a predetermined threshold;
graduating, by one or more computers, the subset of candidate keywords for inclusion in a set of actual keywords, wherein the set of actual keywords includes at least one of the one or more advertiser keywords and at least one candidate keyword in the identified subset;
associating the set of actual keywords with the advertisement; and,
subsequent to the graduation, providing the advertisement in response to second content requests, wherein when any keyword in the set of actual keywords satisfy a second content request, charging the advertiser the cost upon a presentation or selection or conversion of the advertisement.

11. The system of claim 10, further comprising:
ranking the one or more candidate keywords based on predicted performance statistics associated with the one or more candidate keywords; and
wherein automatically identifying one or more candidate keywords comprises identifying the one or more candidate keywords based on the ranking.

12. A computer storage medium encoded with a computer program, the program comprising instructions that when executed by data processing apparatus cause the data processing apparatus to perform operations, comprising:
receiving a selection of one or more advertiser keywords, from an advertiser, to associate with an advertisement;
automatically identifying one or more candidate keywords to associate with the advertisement, wherein the advertisement is associated with a cost and the one or more candidate keywords are different from the one or more advertiser keywords;
associating the subset of the one or more candidate keywords and the one or more advertiser keywords with the advertisement;
providing the advertisement in response to first content requests, wherein:
when the one or more candidate keywords satisfy a first content request without the one or more advertiser keywords satisfying the first content request, not charging the advertiser the cost upon a presentation or selection or conversion of the advertisement and;
when the one or more advertiser keywords satisfy the first content request without the one or more candidate keywords satisfying the first content request, charging the advertiser the cost upon a presentation or selection or conversion of the advertisement;
monitoring performance statistics associated with the one or more candidate keywords associated with the advertisement provided in response to the first content requests;
identifying a subset of the one or more candidate keywords based on the monitored performance statistics, wherein each candidate keyword in the identified subset performs better than a predetermined threshold;
graduating, by one or more computers, the subset of candidate keywords for inclusion in a set of actual keywords, wherein the set of actual keywords includes at least one of the one or more advertiser keywords and at least one candidate keyword in the identified subset;
associating the set of actual keywords with the advertisement; and,
subsequent to the graduation, providing the advertisement in response to second content requests, wherein when any keyword in the set of actual keywords satisfy a second content request, charging the advertiser the cost upon a presentation or selection or conversion of the advertisement.

13. The method of claim 2, further comprising:
providing advertisements in response to the first content requests, wherein the one or more candidate creatives satisfy the first content requests;
monitoring the performance statistics associated with the one or more candidate creatives in the subset associated with the advertisement provided in response to the first content requests;
modifying the subset of the one or more candidate creatives based on the performance statistics monitored;
associating one or more actual creatives with the advertisement, wherein the one or more actual creatives include the subset of the one or more candidate creatives; and
providing the advertisement in response to the second content requests, wherein the one or more actual creatives satisfy the second content requests.

14. The system of claim 10, further comprising:
identifying one or more candidate creatives to associate with the advertisement;
determining a subset of the one or more candidate creatives; and
associating the subset of the one or more candidate creatives with the advertisement.

15. The system of claim 14, further comprising:
providing advertisements in response to the first content requests, wherein the one or more candidate creatives satisfy the first content requests;
monitoring the performance statistics associated with the one or more candidate creatives in the subset associated with the advertisement provided in response to the first content requests;
modifying the subset of the one or more candidate creatives based on the performance statistics monitored;
associating one or more actual creatives with the advertisement, wherein the one or more actual creatives include the subset of the one or more candidate creatives; and
providing the advertisement in response to the second content requests, wherein the one or more actual creatives satisfy the second content requests.

16. The computer storage medium of claim 12, further comprising:
identifying one or more candidate creatives to associate with the advertisement;
determining a subset of the one or more candidate creatives; and
associating the subset of the one or more candidate creatives with the advertisement.

17. The computer storage medium of claim 16, further comprising:
providing advertisements in response to the first content requests, wherein one or more candidate creatives from the subset of the one or more candidate creatives satisfy the first content requests;
monitoring the performance statistics associated with the one or more candidate creatives in the subset associated with the advertisement provided in response to the first content requests;
modifying the subset of the one or more candidate creatives based on the performance statistics monitored;
associating one or more actual creatives with the advertisement, wherein the one or more actual creatives include the subset of the one or more candidate creatives; and
providing the advertisement in response to the second content requests, wherein the one or more actual creatives satisfy the second content requests.

18. The method of claim 1, wherein the one or more candidate keywords are identified without input by the advertiser.

19. The method of claim 1, wherein the one or more actual keywords are identified without input by the advertiser.

20. The system of claim 10, wherein the one or more candidate keywords are identified without input by the advertiser.

21. The computer storage medium of claim 12, wherein the one or more candidate keywords are identified without input by the advertiser.

* * * * *

UNITED STATES PATENT AND TRADEMARK OFFICE
CERTIFICATE OF CORRECTION

PATENT NO. : 8,326,806 B1
APPLICATION NO. : 11/747367
DATED : December 4, 2012
INVENTOR(S) : Arash Baratloo Page 1 of 1

It is certified that error appears in the above-identified patent and that said Letters Patent is hereby corrected as shown below:

In Claim 10, Line 7, Column 16, delete "and," and insert -- and --, therefor.

In Claim 12, Line 61, Column 16, delete "and," and insert -- and --, therefor.

Signed and Sealed this
Twelfth Day of March, 2013

Teresa Stanek Rea
*Acting Director of the United States Patent and Trademark Office*

UNITED STATES PATENT AND TRADEMARK OFFICE
CERTIFICATE OF CORRECTION

| | |
|---|---|
| PATENT NO. | : 8,326,806 B1 |
| APPLICATION NO. | : 11/747367 |
| DATED | : December 4, 2012 |
| INVENTOR(S) | : Arash Baratloo et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 630 days.

Signed and Sealed this
Fourteenth Day of October, 2014

Michelle K. Lee
*Deputy Director of the United States Patent and Trademark Office*